United States Patent
Zheng et al.

(10) Patent No.: US 9,886,400 B2
(45) Date of Patent: Feb. 6, 2018

(54) COMMUNICATION SYSTEM AND COMMUNICATION METHOD

(71) Applicants: BOE TECHNOLOGY GROUP CO., LTD., Beijing (CN); BEIJING BOE SPECIAL DISPLAY TECHNOLOGY CO., LTD., Beijing (CN)

(72) Inventors: Yuewei Zheng, Beijing (CN); Lijun Su, Beijing (CN); Chenfei Qian, Beijing (CN)

(73) Assignees: BOE TECHNOLOGY GROUP CO., LTD., Beijing (CN); BEIJING BOE SPECIAL DISPLAY TECHNOLOGY CO., LTD., Beijing (CN)

( * ) Notice: Subject to any disclaimer, the term of this patent is extended or adjusted under 35 U.S.C. 154(b) by 388 days.

(21) Appl. No.: 14/437,008

(22) PCT Filed: Jul. 31, 2014

(86) PCT No.: PCT/CN2014/083372
§ 371 (c)(1),
(2) Date: Apr. 20, 2015

(87) PCT Pub. No.: WO2015/096478
PCT Pub. Date: Jul. 2, 2015

(65) Prior Publication Data
US 2016/0026584 A1 Jan. 28, 2016

(30) Foreign Application Priority Data
Dec. 25, 2013 (CN) .......................... 2013 1 0727077

(51) Int. Cl.
*G06F 3/00* (2006.01)
*G06F 13/10* (2006.01)
(Continued)

(52) U.S. Cl.
CPC ........ *G06F 13/102* (2013.01); *G06F 9/44505* (2013.01); *H04W 56/0015* (2013.01); *H04W 74/00* (2013.01)

(58) Field of Classification Search
None
See application file for complete search history.

(56) References Cited

U.S. PATENT DOCUMENTS 6,577,229 B1 * 6/2003 Bonneau .............. G06K 7/0008
235/379
6,640,268 B1 * 10/2003 Kumar .................. G06F 13/366
710/15
(Continued)

FOREIGN PATENT DOCUMENTS

| CN | 101098359 A | 1/2008 |
| CN | 101232425 A | 7/2008 |

(Continued)

OTHER PUBLICATIONS

Notification of the Second Office Action dated Jan. 6, 2016 corresponding to Chinese application No. 201310727077.4.
(Continued)

*Primary Examiner* — Elias Mamo
(74) *Attorney, Agent, or Firm* — Nath, Goldberg & Meyer; Joshua B. Goldberg (57) ABSTRACT

The present invention provides a communication system comprising a host computer, control cabinets and peripheral devices, the control cabinets comprising serial ports used for communication among the peripheral devices and the host computer. The operating period of the communication system includes a polling phase and a free communication phase, in the polling phase the host computer sends query instructions to the control cabinets through the serial ports on each of the control cabinets, and in the free communication phase the control cabinets communicate with corre- (Continued)

sponding peripheral devices through the serial ports. The present invention also provides a communication method for the communication system. Using the communication system of the present invention, reliability of communication among the control cabinets, the host computer and the peripheral devices through a same serial port can be ensured without increasing hardware volume and costs of the communication system.

19 Claims, 5 Drawing Sheets

(51) Int. Cl.
*H04W 74/00* (2009.01)
*G06F 9/445* (2006.01)
*H04W 56/00* (2009.01)

(56) References Cited

U.S. PATENT DOCUMENTS

| | | | |
|---|---|---|---|
| 9,021,143 B2* | 4/2015 | Chandrasekaran et al. | G06F 13/102 710/18 |
| 2003/0070031 A1* | 4/2003 | Howard | G06F 1/3203 710/310 |
| 2008/0101382 A1* | 5/2008 | Bannerjee | H04L 47/10 370/400 |
| 2010/0313059 A1* | 12/2010 | Wang | H03L 7/07 713/502 |
| 2014/0075073 A1* | 3/2014 | Wong | G06F 13/22 710/220 |
| 2014/0207879 A1* | 7/2014 | Tu | H04L 51/30 709/206 |

FOREIGN PATENT DOCUMENTS

| | | |
|---|---|---|
| CN | 101374360 A | 2/2009 |
| CN | 101500331 A | 8/2009 |
| CN | 101655826 A | 2/2010 |
| CN | 102081585 A | 6/2011 |
| CN | 102739489 A | 10/2012 |
| CN | 102866976 A | 1/2013 |
| CN | 103196494 A | 7/2013 |

OTHER PUBLICATIONS

International Search Report dated Nov. 4, 2014 issued in International Application No. PCT/CN2014/083372.
1st office action issued in Chinese application No. 201310727077.4 dated Sep. 6, 2015.

* cited by examiner

COMMUNICATION SYSTEM AND COMMUNICATION METHOD

This is a National Phase Application filed under 35 U.S.C. 371 as a national stage of PCT/CN2014/083372, filed Jul. 31, 2014, and claims priority benefit from Chinese Application No. 201310727077.4, filed Dec. 25, 2013, the content of each of which is hereby incorporated by reference in its entirety.

FIELD OF THE INVENTION

The present invention relates to communication among a host computer and peripheral devices, in particular to a communication system and a communication method applied in the communication system.

BACKGROUND OF THE INVENTION

In the modern industry, typically a plurality of production equipments (i.e., peripheral devices) in charge of different production processes are included. In order to understand the production progress of the different equipments and the parameters of the equipments themselves, the equipments shall be monitored using a host computer. At present, the communication between the host computer and peripheral devices are usually realized via the serial ports of the control cabinet. That is, the control cabinet communicates with the peripheral devices via the serial ports to obtain data from the peripheral devices, and the control cabinet communicates with the host computer via the serial ports to transfer the data obtained from the peripheral devices to the host computer.

With diversity of the data transmission in industrial production, the amount of the serial ports in the control cabinet may not meet the requirement for data transfer among the control cabinet and the host computer and peripheral devices. There are two common solutions: firstly, increasing the amount of the serial ports in the control cabinet; secondly, using the transmission packet protocol analysis, i.e. one serial port in the control cabinet communicates with two or more serial port devices (including the host computer and the peripheral devices) at the same time, wherein the different serial port devices are distinguished through different packet protocol analysis.

The first solution leads to increased costs and hardware volume, the second one suffers from a case there the data from two serial port devices are mixed which causes unrecognizable code due to parse error.

Thus, a technical problem remains in the present field about how to conduct reliable communication among the control cabinets, the host computer and the peripheral devices without increasing the equipment costs and hardware volume.

SUMMARY

The purpose of the present invention is to provide a communication system and a communication method, wherein the control cabinet in the communication system can reliably communicate with a host computer and peripheral devices, and will not increase the cost and hardware volume of the communication system.

To achieve the above object, as one aspect of the present invention, there is provided a communication system comprising a host computer, control cabinets and peripheral devices, the control cabinets comprising serial ports used for communication among the peripheral devices and the host computer, wherein, when the communication system is in an operating phase, a system period of the communication system includes a polling phase and a free communication phase, in the polling phase the host computer sends query instructions to the control cabinets through the serial ports on each of the control cabinets, and in the free communication phase the control cabinets communicate with the peripheral devices through the serial ports.

Preferably, the host computer comprises a host computer processor and a host computer digital radio station electrically connected with the host computer processor, the host computer digital radio station communicates with the control cabinets, the host computer processor monitors the peripheral devices and the control cabinets by acquiring data from the control cabinets through the host computer digital radio station.

Preferably, the control cabinet comprises a control device, a control cabinet digital radio station that can communicate with the host computer, and a wireless transceiver that can communicate with the peripheral devices, the control cabinet digital radio station and the wireless transceiver communicate with the control device through a same serial port, wherein in the polling phase the host computer sends the query instructions to the control cabinet digital radio station, and in the free communication phase the control device communicates with the peripheral devices via the wireless transceiver.

Preferably, the host computer is provided with a high level timer, the control cabinet is provided with a low level timer, wherein in the polling phase the host computer sends a destination packet including a clock value of the high level timer to the control cabinet, the control cabinet compares the clock value of the high level timer with the clock value of the low level timer, and synchronize the high level timer with the low level timer.

Preferably, in the synchronization phase of the communication system, the host computer sends a handshake packet including the clock value of the high level timer to the control cabinet, the control cabinet receiving the handshake packet compares the clock value of the high level timer with the clock value of the low level timer, so as to synchronize the high level timer with the low level timer.

Preferably, within a system period, the polling phase occupies 1 time slice, and the free communication phase occupies at least one time slice.

Preferably, the host computer is provided with a first arithmetic unit electrically connected to the host computer processor, the control cabinet is provided with a second arithmetic unit electrically connected to the control device, the first arithmetic unit is configured to calculate a first remainder obtained by dividing the clock value of the high level timer by the system period, the host computer processor determines whether the host computer is in the polling phase on the basis of the first remainder, the second arithmetic unit is configured to calculate a second remainder obtained by dividing the clock value of the low level timer by the system period, the control device determines whether the control cabinet is in the free communication phase on the basis of the second remainder.

As another aspect of the present invention, there is provided a communication method for above communication system provided by the present invention, wherein the communication method comprising a query step in the operating phase, the query step comprises:

S2, determining the temporal state of the communication system;

if the communication system is in the polling phase, then performs step S32: the host computer sends the query instruction to the control cabinet;

if the communication system is in the free communication phase, then performs step S33: the control cabinet communicates with peripheral devices.

Preferably, before the step S32, the following step is included:

S31, the host computer sends idle monitoring instructions to the control cabinet, if it is monitored the control cabinet is idle, then performs step S32; if it is monitored the control cabinet is busy, then repeat step S31 until the control cabinet is idle.

Preferably, when the communication system is in the polling phase, the step S32 comprises:

S32a, the host computer sends a destination packet to the control cabinet, upon receipt of the destination packet, the control cabinet updates the low level timer based on the clock value of the high level timer in the destination packet, so as to synchronize the high level timer with the low level timer; and S32b, the control cabinet sends target data to the host computer.

Preferably, the step S2 comprises:

S21, the host computer obtains the clock value of the high level timer, and the control cabinet obtains the clock value of the low level timer;

S22, the first arithmetic unit calculates a first remainder by dividing the clock value of the high level timer by the system period, when the first remainder is smaller than the period required for the polling phase, it is determined that the host computer is in the polling phase, and when the first remainder is larger than the period required for the polling phase, it is determined that the host computer is in the free communication phase; the second arithmetic unit calculates a second remainder by dividing the clock value of the low level timer by the system period, when the second remainder is smaller than the period required for the polling phase, it is determined that the control cabinet is in the polling phase, and when the second remainder is larger than the period required for the polling phase, it is determined that the control cabinet is in the free communication phase.

Preferably, the communication system further comprises an auxiliary device, the auxiliary device is connected with the control device in the control cabinet and provides auxiliary parameters to the control device.

Preferably, the communication method further comprises a synchronization step before the query step, the synchronization step which is performed at a synchronization phase comprising:

S11, the host computer sends the handshake packet to the control cabinet;

S12, the control cabinet updates the clock value of the low level timer in the control cabinet based on the clock value in the handshake packet, so as to synchronize the high level timer with the low level timer.

Preferably, the synchronization step further comprises:

S10, after the host computer is powered-up, monitoring in a first predetermined time whether the control cabinet is idle; if it is monitored the control cabinet is idle, then performs step S11.

Preferably, the period required for the synchronization step is 1~5 times of the system period.

Preferably, if the control cabinet fails to receive the handshake packet in the synchronization phase, the control cabinet performs step S33.

According to the communication system and communication method of the present invention, in the polling phase, the host computer sends query instructions to the control cabinets to acquire data from the control cabinets; in the free communication phase, a equivalent communications link is established between the control cabinets and the peripheral devices, both the control cabinets and the peripheral devices can initiate communication. Thus, only one type of data can pass through the serial ports of the control cabinets at a same time. For example in the polling phase, only the query instructions sent by the host computer is delivered to the control cabinets through the serial ports, and in the free communication phase, only the communication data between the peripheral devices and the control cabinets pass through the serial ports. Therefore the data passing through the serial ports at any time will not be disturbed. The control cabinets can communicate with the peripheral devices and the host computer using a same serial port, such that communication among the control cabinets, the host computer of the communication system and the peripheral devices can be conducted reliably without increasing costs and hardware volume of the communication system.

BRIEF DESCRIPTION OF THE DRAWINGS

The drawings are used to provide a further understanding of the present invention, and constitute a part of the specification for explaining the present invention together with the following detailed description, but shall not be construed as limiting the present invention. In the drawings.

REFERENCE NUMERALS

100: host computer
110: host computer digital radio station
120: host computer processor
130: high level timer
140: first arithmetic unit
200: control cabinet
210: control device
220: control cabinet digital radio station
230: wireless transceiver
240: low level timer
250: second arithmetic unit
300: peripheral device
400: auxiliary device

DETAILED DESCRIPTION OF THE EMBODIMENTS

The specific embodiments will be described in detail with reference to the drawings of the present invention. It should be understood that the specific embodiments described herein are only intended to illustrate and explain the present invention, not to limit the present invention.

Figure 1:
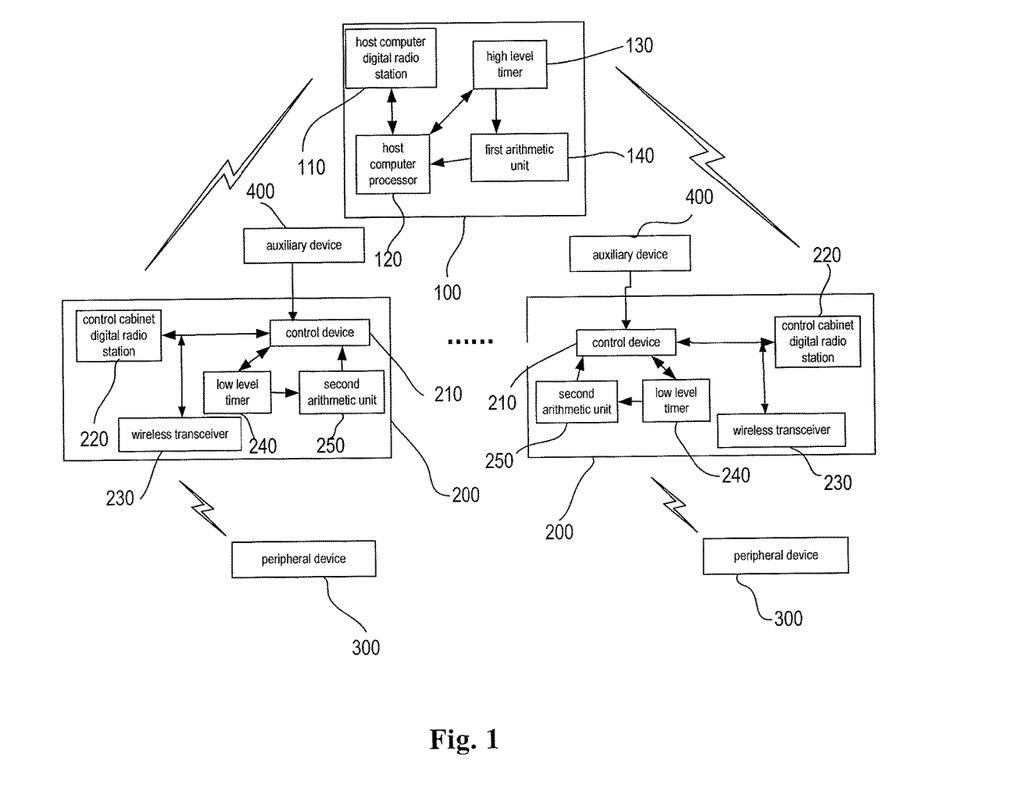
FIG. 1 is a schematic view of the communication system according to the present invention.

As shown in FIG. 1, as an aspect of the present invention, there is provided a communication system comprising a host computer 100, control cabinets 200 and peripheral devices 300, the control cabinets 200 comprises serial ports (not shown) used for communication among the peripheral devices 300 and the host computer 100, wherein, when the communication system is in the operating phase, a system period of the communication system includes a polling phase and a free communication phase, in the polling phase the host computer 100 sends query instructions to the control cabinets 200 through the serial ports on each of the control cabinets 200, and in the free communication phase the control cabinets 200 communicate with the peripheral devices 300 through the same serial ports.

According to the communication system, in the polling phase, the host computer sends query instructions to the control cabinets to acquire data from the control cabinets; in the free communication phase, a equivalent communications link is established between the control cabinets and the peripheral devices, both the control cabinets and the peripheral devices can initiate communication. Thus, only one type of data can pass through the serial ports of the control cabinets at a same time. For example in the polling phase, only the query instructions sent by the host computer is delivered to the control cabinets through the serial ports, and in the free communication phase, only the communication data between the peripheral devices and the control cabinets pass through the serial ports. Therefore the data passing through the serial ports at any time will not be disturbed. The control cabinets can communicate with the peripheral devices and the host computer using a same serial port, such that communication among the control cabinets, the host computer of the communication system and the peripheral devices can be conducted reliably without increasing costs and hardware volume of the communication system.

As a specific embodiment of the present invention, the host computer 100 comprises a host computer processor 120 and a host computer digital radio station 110 electrically connected with the host computer processor 120, the host computer digital radio station 110 communicates with the control cabinets 200. The host computer processor monitors the peripheral devices 300 and the control cabinets 200 by acquiring data from the control cabinets 200 through the host computer digital radio station 110.

As described above, the operation period of the communication system is a period where the peripheral devices operates normally and the host computer monitors the operation status of the peripheral devices through the control cabinets; the operation period of the communication system comprises a polling phase and a free communication phase. In the polling phase, the host computer processor 120 sends query instructions to the control cabinets 200 through the host computer digital radio station 110, so as to acquire data from the control cabinets 200; in the free communication phase, an equivalent communications link is established between the control cabinets 200 and the peripheral devices 300, both the control cabinets 200 and the peripheral devices 300 can initiate communication. Thus, only one type of data can pass through the serial ports of the control cabinets at a same time. For example in the polling phase, only the query instructions sent by the host computer 100 is delivered to the control cabinets 200 through the serial ports, and in the free communication phase, only the parameters of the peripheral devices 300 or the data of the control cabinets 200 pass through the serial ports. Therefore the data passing through the serial ports at any time will not be disturbed. The control cabinets 200 can communicate with the peripheral devices 300 and the host computer 100 using a same serial port, therefore the hardware volume of the communication system can be reduced.

It should be understood that within an operation period of the communication system, the host computer 100 acquires data from the peripheral devices 300 and the data of the control cabinets 200 themselves through the control cabinets 200, and the control cabinets 200 acquire data from the peripheral devices 300. A host computer 100 corresponds to a plurality of control cabinets 200 (FIG. 1 shows only two control cabinets), each control cabinet 200 corresponds to a corresponding peripheral device. During operation of the communication system, the data stored on the respectively control cabinets 200 is different; in different periods, the host computer 100 requires data from different control cabinets 200, so the host computer 100 polls different control cabinets 200 periodically. A monitoring program is set in the host computer processor 120. When the monitoring program requires data from specific control cabinet, then the host computer 100 communicates with the control cabinet through the host computer digital radio station 110 in the polling phase, so as to acquire necessary data.

When the communication system performs communication, the host computer digital radio station 110 of the host computer 100 sends query instructions to the control cabinets 200 only in the polling phase, and the control cabinets 200 communicates with the peripheral devices 300 only in the free communication phase, such that the case where the control cabinets 200, the host computer 100 and the peripheral devices 300 communicate at the same time can be avoided, thus avoiding the risk of generating a parse error. By using the communication system of the present invention, the reliability of communication among the control cabinets 200, the host computer 100 and the peripheral devices 300 can be ensured. Moreover, the communication system of the present invention does not increase the amount of the serial ports in the control cabinets 200, so as to avoid increasing hardware volume and costs of the communication system.

In the present invention, the peripheral devices 300 are equipments for performing specific production process. The peripheral devices 300 communicate with the control cabinets 200 to transmit the data of the peripheral devices 300 (e.g. the process parameters, the operating parameters of the peripheral device 300 itself) to the control cabinets 200. In the polling phase, the control cabinets 200 send the data of the peripheral devices 300 to the host computer 100.

It is readily understood that in the free communication phase, the host computer 100 does not issue instruction, but can receive data.

In the polling phase, the control cabinets 200 communicates with the host computer digital radio station 110 via serial ports, and in the free communication phase, the control cabinets 200 communicates with the peripheral devices 300 via the serial ports. to achieve the above functions, preferably, the control cabinet 200 comprises a control device 210, a control cabinet digital radio station 220 that can communicate with the host computer 100, and a wireless transceiver 230 that can communicate with the peripheral devices 300, the control cabinet digital radio station 220 and the wireless transceiver 230 communicate with the control device 210 through a same serial port, wherein in the polling phase the control device 210 communicates with the host computer 100 through the control cabinet digital radio station 220, and in the free communication phase the control device 210 communicates with the peripheral devices 300 via the wireless transceiver 230. It is readily understood that the peripheral device 300 may include a remote controller for transmitting data, data of the peripheral device 300 can be transmitted to the wireless transceiver 230 of the control cabinet 200 through the remote controller.

During the operation period of the communication system, the clock of the host computer 100 and the clock of the control cabinet 200 should be time synchronized, so as to ensure the control cabinet 200 and the host computer 100 are both in the polling phase, and after the polling phase the control cabinet 200 can enter the free communication phase, and ensure that the host computer 100 does not send instruction to the control cabinet 200. Above object can be achieved by various ways, for example, both the control cabinet 200 and the host computer 100 can be provided with precise clock, such that the control cabinet 200 and the host computer 100 can be synchronized precisely. It should be understood that, although in the free communication phase the host computer 100 does not send instruction to the control cabinet 200, the host computer 100 can receive the communication procedure data between the control cabinets 200 and the peripheral devices 300 and record the communication procedure data.

In order to reduce costs, preferably, the host computer 100 is provided with a high level timer 130, and each control cabinet 200 is provided with a low level timer 240.

In the polling phase, the processor 120 of the host computer 100 sends a destination packet including a clock value of the high level timer 130 to the control cabinet 200 through the host computer digital radio station 110, the control cabinet 200 compares the clock value of the high level timer 130 with the clock value of the low level timer 240, and synchronize the high level timer 130 with the low level timer 240.

It should be understood that, only when the control cabinet 200 is idle (i.e. not communicating with the peripheral devices 300), the control cabinet 200 is capable of receiving the destination packet sent through the host computer digital radio station 110.

The destination packet is used for query data in the control cabinet 200. Specifically, the data in the control cabinet 200 may include the operating parameters of the control cabinet 200 itself, the operating parameters of the peripheral devices 300 corresponding to the control cabinet 200 and corresponding process parameters.

Typically, the serial ports of the control cabinet 200 use a little-port mode. In order to facilitate data processing, all the numeric types use a little-port format. The definition of the destination packet is shown in Table 1:

TABLE 1

| synchronous code | destination address | command code | parameter length | command parameters | check code |
|---|---|---|---|---|---|
| 1 Byte | 1 Byte | 1 Byte | 2 Byte | N*1 Byte | 1 Byte |

(1) Synchronous code (1Byte): the value is a constant 0x3A (i.e. the symbol ":"), for determining the starting position of a command when parsing the command;

(2) Destination address (1Byte): device communication address 2-16, reserved address 0 as the broadcast address, 1 is the main station address;

(3) Command code (1Byte): function number;

(4) Parameter length (2Bytes): indicating the number of bytes of data in the packet, assumed to be N;

(5) Command parameters: parameter required to execute the command code, the length is N*1 Byte; when N=0, the packet will not have this data item;

(6) Check code (1Byte): for verifying all the data from Address to Data.

The check code algorithm is to obtain a sum of all the data from the destination address to the command parameters in bytes, and the sum is divided by 256, the remainder is the check code. The check code can be calculated as follows:

Check code=(destination address+command code+ parameter length+Data[0]+ . . . +Data[$N$−1]) MOD 256.

The entire operation period of the communication system may include a synchronization phase and an operating phase. A period of time after the communication system is powered-up (including power-up of the host computer 100, the control cabinets 200 and the peripheral devices 300) is the synchronization phase of the communication system. In the synchronization phase, the control cabinets 200 and the peripheral devices 300 are powered-up initially, the low level timer 240 in the control cabinets 200 starts counting, typically with a step of 1 ms. In the synchronization phase of the communication system, the host computer 100 sends a handshake packet including the clock value of the high level timer 130 to the control cabinet 200 through the host computer digital radio station 110, the control cabinet 200 receiving the handshake packet compares the clock value of the high level timer 130 with the clock value of the low level timer 240, so as to synchronize the high level timer 130 with the low level timer 240. As described above, each host computer 100 corresponds to a plurality of control cabinets 200, thus preferably, in the synchronization phase, all of the control cabinets 200 can be synchronized with the host computer 100 and enter the operating phase.

If within the synchronization phase, not all of the control cabinets 200 have received a handshake packet from the host computer 100, the control cabinets 200 without receipt of the handshake packets directly enter the free communication phase and communicate with the peripheral devices 300. When the control cabinets 200 which have entered the free communication phase receive the destination packet issued by the host computer 100, the control cabinets 200 update their low level timers 240 based on the clock value of the high level timer 130 in the destination packet, such that the host computer 100 and the control cabinets 200 can be synchronized.

After the synchronization phase, the communication system enters the operating phase, the host computer processor 120 of the host computer 100 determines whether the communication system is in the polling phase or in the free communication phase. If the host computer processor 120 determines that the communication system is in the polling phase, then the host computer processor 120 sends the destination packet to the predetermined control cabinets 200 and receives corresponding target data. If the host computer processor 120 determines that the communication system is in the free communication phase, then wait for the next polling phase. While waiting, the host computer 100 only receive data, without sending any instruction.

Figure 2:
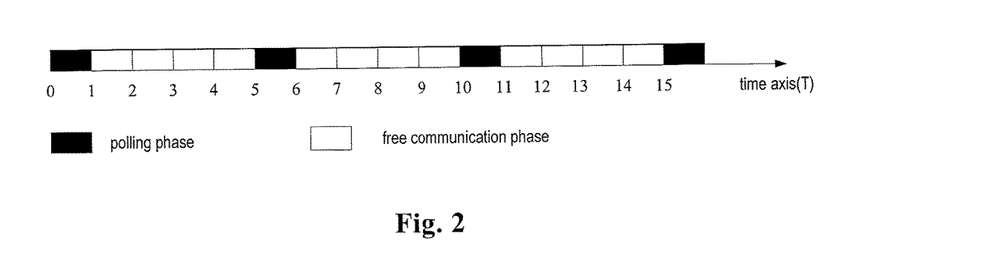
FIG. 2 is a division diagram of a system period.

In the present invention, the time occupied by the polling phase and the free communication phase are not limited. Typically, the polling phase occupies 1 time slice T, and the free communication phase occupies n time slice T, n being an integer no less than 1. When the data transmitted from the peripheral devices 300 to the control cabinets 200 reaches certain value, the host computer 100 communicates with the control cabinets 200 to acquire the data from the peripheral devices 300 and the control cabinets 200. For example in the embodiment shown in FIG. 2, each period has a length of 5T, 1T for the polling phase and 4T for the free communication phase.

The specific time for each time slice T can be determined according to the specific circumstances of serial communications. Assuming in the communication settings, the baud rate is 9600 bps; one start bit, 8 data bits, 1 parity check bit, 2 stop bits are included, 12 bits are required to send a symbol, 800 bytes can be transmitted per second in theory, and the transmission time for each symbol is 1000 ms/800=1.25 ms. Assuming the maximum length of a protocol packet is 100 bytes, a time slice in theory is T=1.25 ms×100=125 ms. Considering the communication delay, certain margin shall be reserved. The actual time slice may be 2-4 times of the theoretical time slice, assuming the time slice T=125 ms×4=500 ms is chosen, the system period is 2500 ms, the polling phase occupies 500 ms, and the free communication phase occupies 2000 ms.

As described above, in the present invention, the control cabinet 200 may include the control device 210, the control cabinet digital radio station 220 and the wireless transceiver 230 connected via the serial ports. The peripheral device 300 may include the remote controller, the control cabinet digital radio station 220 communicates with the host computer digital radio station 110 of the host computer 100, the wireless transceiver 230 communicates with the remote controller of the peripheral device 300.

In the present invention, the type of the serial ports is specifically defined, for example, the serial port may be RS-485 bus.

It can be readily understood that the low level timer 240 of the control cabinet 200 is electrically connected with the control device 210.

The host computer 100 is provided with a first arithmetic unit 140 electrically connected to the host computer processor 120, the control cabinet 200 is provided with a second arithmetic unit 250 electrically connected to the control device 210.

The first arithmetic unit 140 is configured to calculate a first remainder t1 obtained by dividing the clock value of the high level timer 130 by the system period, the host computer processor 120 determines whether the host computer 100 is in the polling phase on the basis of the first remainder t1. Specifically, when the first remainder t1 is smaller than the period required for the polling phase, it is determined that the host computer 100 is in the polling phase, and the host computer processor 120 communicates with the control cabinet 200 via the host computer digital radio station 110.

The second arithmetic unit 250 is configured to calculate a second remainder t2 obtained by dividing the clock value of the low level timer 240 by the system period, the control device 210 determines whether the control cabinet 200 is in the free communication phase on the basis of the second remainder t2. When the second remainder t2 is larger than the period required for the polling phase, it is determined that the control cabinet 200 is in the free communication phase, the control cabinet 200 may communicate with the peripheral devices 300; when t2 is smaller than the period required for the polling phase, it is determined that the control cabinet 200 is in the polling phase, then the control cabinet 200 can receive the query instructions from the host computer 100.

In the case where the host computer 100 is synchronized with the control cabinet 200, the first remainder t1 calculated by the first arithmetic unit 140 is equal to the second remainder t2 calculated by the second arithmetic unit 250.

The communication system may further comprise an auxiliary device 400, the auxiliary device 400 is connected with the control device 210 of the control cabinet 200 and provide auxiliary parameters (e.g., ambient temperature) to the control device 210. The auxiliary device 400 may communicate with the control cabinet 200, and the control cabinet 200 may send the data provided by the auxiliary device 400 to the host computer 100 as necessary.

The auxiliary device 400 may communicate with the control cabinet 200 through other serial ports, that is, the auxiliary device 400 may not share serial ports with the host computer 100 and the peripheral devices 300.

Figure 4:
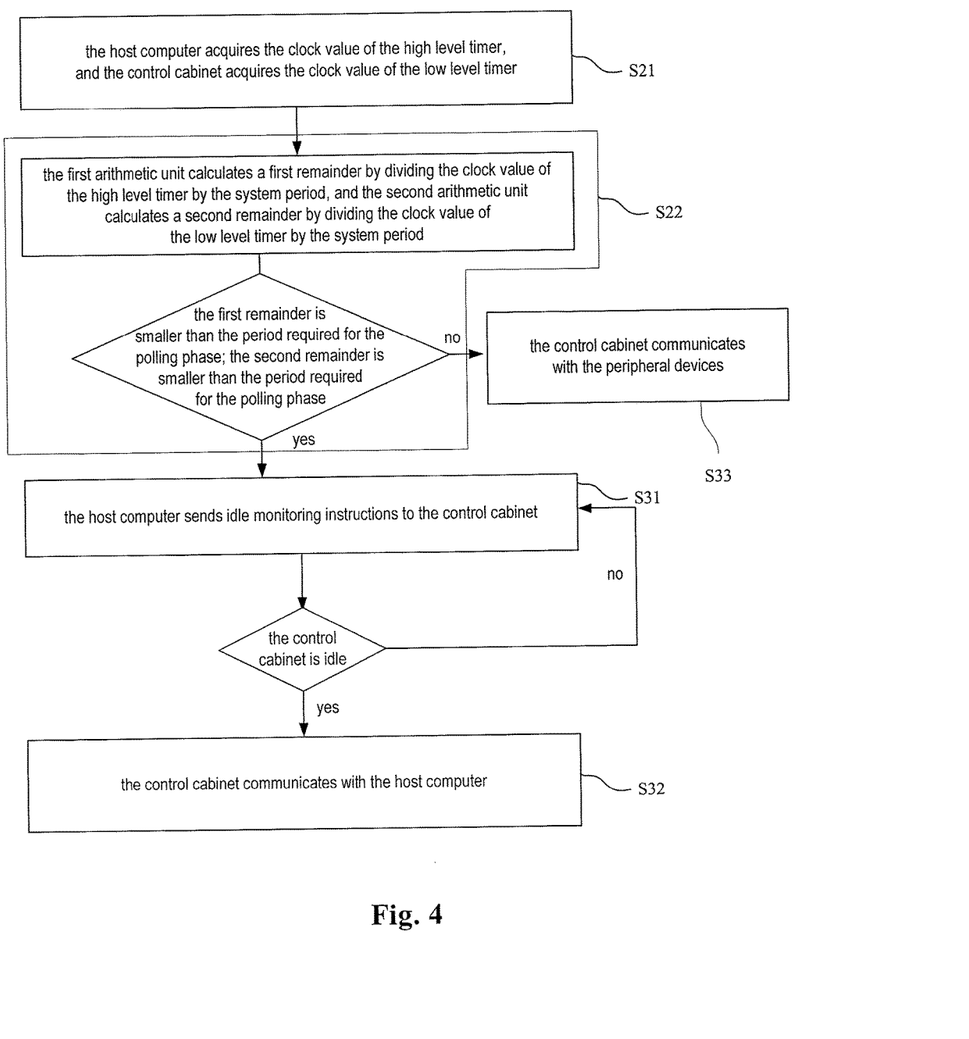
FIG. 4 is a flowchart of the query step in the communication method according to the present invention.

As shown in FIG. 4, as another aspect of the invention, there is provided a communication method for the communication system, wherein the communication method comprising a query step in the operating phase, the query step comprises:

S2, determining the temporal state of the communication system.

As described above, when the communication system is in the operating phase, the system period includes a polling phase and a free communication phase. Therefore in the operating phase, the temporal state of the communication system includes two states, in one state the communication system is in the polling phase, and in the other state the communication system is in the free communication phase.

If the communication system is in the polling phase, then perform step S32: the host computer sends the query instruction to the control cabinet;

If the communication system is in the free communication phase, then perform step S33: the control cabinet communicates with peripheral devices.

By the step S32, the host computer acquires data from the control cabinet (including the data of the control cabinet itself and data acquired by the control cabinet from the peripheral devices); and by the step S33, the control cabinet acquires data from the peripheral devices.

In the communication method, the host computer sends query instructions to the control cabinets only in the polling phase (step S32), and the control cabinets communicates with the peripheral devices only in the free communication phase (step S33), such that the risk of generating a parse error caused by the case where the control cabinets, the host computer 100 and the peripheral devices communicate at the same time can be avoided. The reliability of communication among the control cabinets, the host computer and the peripheral devices through a same serial port can be ensured. Moreover, the communication system of the present invention does not increase the amount of the serial ports in the control cabinets, so as to avoid increasing hardware volume and costs of the communication system.

The control cabinet can communicate with the host computer only when it is idle, i.e. the control cabinet does not communicate with corresponding peripheral devices. Since the host computer is only capable of determining whether the host computer itself is in the polling phase, the control cabinet is only capable of determining whether the control cabinet itself is in the polling phase. The host computer and the control cabinet may be not synchronized, e.g. the host computer has entered the polling phase while the control cabinet in not in the polling phase. In this case, in order to avoid data mixture in the control cabinet, preferably, a step of determining whether the control cabinet is idle can be performed before the step S32; specifically, the following step can be included before the step S32:

S31, the host computer sends idle monitoring instructions to the control cabinet, if it is monitored the control cabinet is idle, then performs step S32; if it is monitored the control cabinet is busy (i.e. communicating with the peripheral devices), then repeat step S31 until it is monitored that the control cabinet is idle.

When the communication method is applied, the clock of the host computer and the control cabinet should be the same. Various methods can be used to ensure a consistent clock in the host computer and the control cabinet. For example, the host computer, the control cabinet and corresponding peripheral devices can be started at a same time.

In order to reduce the requirement for operators, preferably the clock in the host computer and the control cabinet can be kept consistent through the following method:

When the communication system is in the polling phase, the step S32 comprises:

S32a, the host computer sends a destination packet to the control cabinet, upon receipt of the destination packet, the control cabinet updates the low level timer based on the clock value of the high level timer in the destination packet, so as to synchronize the high level timer with the low level timer; and S32b, the control cabinet sends target data to the host computer, the target data being the data required in the destination packet.

the advantage of performing step S32a is that, as the communication proceeding, the low level timer in the control cabinet can be kept updated, such that the control cabinet and the host computer can be kept synchronized throughout the communication.

In the following, it will be described how to determine the temporal state of the communication system; the step S2 specifically comprises:

S21, the host computer obtains the clock value of the high level timer, and the control cabinet obtains the clock value of the low level timer;

S22, the first arithmetic unit in the host computer calculates a first remainder t1 by dividing the clock value of the high level timer by the system period, when the first remainder t1 is smaller than the period required for the polling phase, it is determined that the host computer is in the polling phase, and when the first remainder t1 is larger than the period required for the polling phase, it is determined that the host computer is in the free communication phase; the second arithmetic unit calculates a second remainder by dividing the clock value of the low level timer by the system period, when the second remainder is smaller than the period required for the polling phase, it is determined that the control cabinet is in the polling phase, and when the second remainder is larger than the period required for the polling phase, it is determined that the control cabinet is in the free communication phase.

The host computer and the control cabinet are typically synchronized, therefore the temporal state of anyone of the host computer and the control cabinet may represent the operating state of the communication system.

Figure 3:
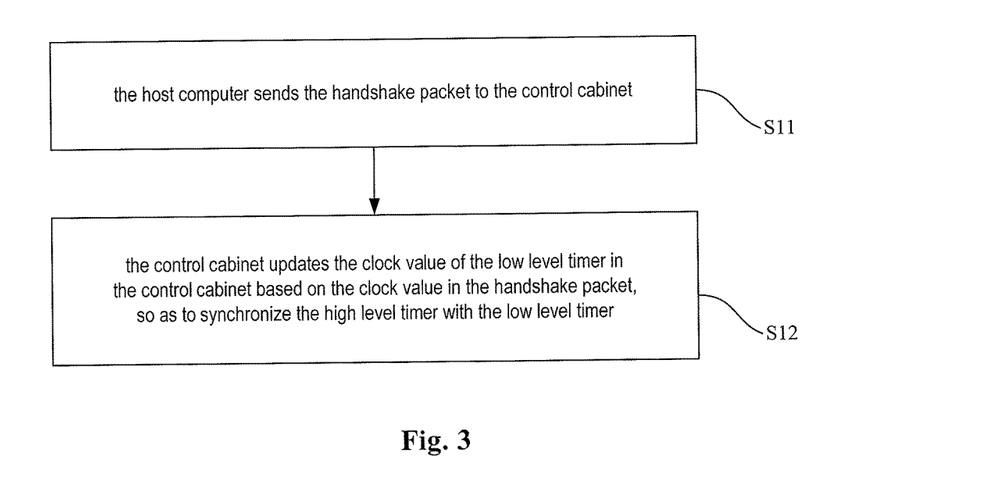
FIG. 3 is a flowchart of the synchronization step in the communication method according to the present invention.

In order to reduce the precise requirement for operators, as shown in FIG. 3, preferably, the communication method further comprises a synchronization step before the query step, the synchronization step is performed at a synchronization phase and comprises:

S11, the host computer sends the handshake packet to the control cabinet;

S12, the control cabinet updates the clock value of the low level timer in the control cabinet based on the clock value in the handshake packet, so as to synchronize the high level timer with the low level timer.

After the synchronization step, the clock of the control cabinet and the host computer are synchronized, so that the communication procedure can be more reliable.

As above, each host computer may correspond to a plurality of control cabinets. As an embodiment of the present invention, the synchronization step further comprises:

S10, after the host computer is powered-up, monitoring in a first predetermined time whether the control cabinet is idle; if it is monitored the control cabinet is idle, then performs step S11. The first predetermined time may be 1 system periods (5T) or 3 system periods (15T).

After the synchronization phase, at least a larger part of the control cabinets are synchronized with the host computer in time.

The synchronization step shall be performed when the host computer and the control cabinets are powered-up, i.e. the communication system is initiated, so as to ensure that when the query step is performed for the first time, the clock of the host computer and the control cabinets are synchronized.

In the present invention, the period for the synchronization step is not particularly defined; it can be started from power-up of the host computer and the control cabinets, till the clock of the host computer and the control cabinets are synchronized. For example, the period for the synchronization step may be 1-5 times of the system period.

In the step S11, the high level timer in the control cabinet increments with a step of 1 ms (i.e. the clock interrupts at 1 ms after start). In the stepped timing phase of the low level timer, the control cabinet waits for the handshake packet from the host computer; and if the handshake packet is received, the low level timer in the control cabinet is updated based on the clock value of the host computer in the handshake packet, so that the low level timer and the high level timer are synchronized.

Each host computer may correspond to a plurality of control cabinets. When there is a large amount of control cabinets, a case where some control cabinets fail to receive the handshake packet when the synchronization step is finished may occurs. If the control cabinet fails to receive the handshake packet in the synchronization phase, the control cabinet enters the free communication phase and performs step S33 to communicate with the peripheral devices. When the control cabinet receives the destination packet sent by the host computer in the operating phase, then it can be synchronized with the host computer.

Figure 5:
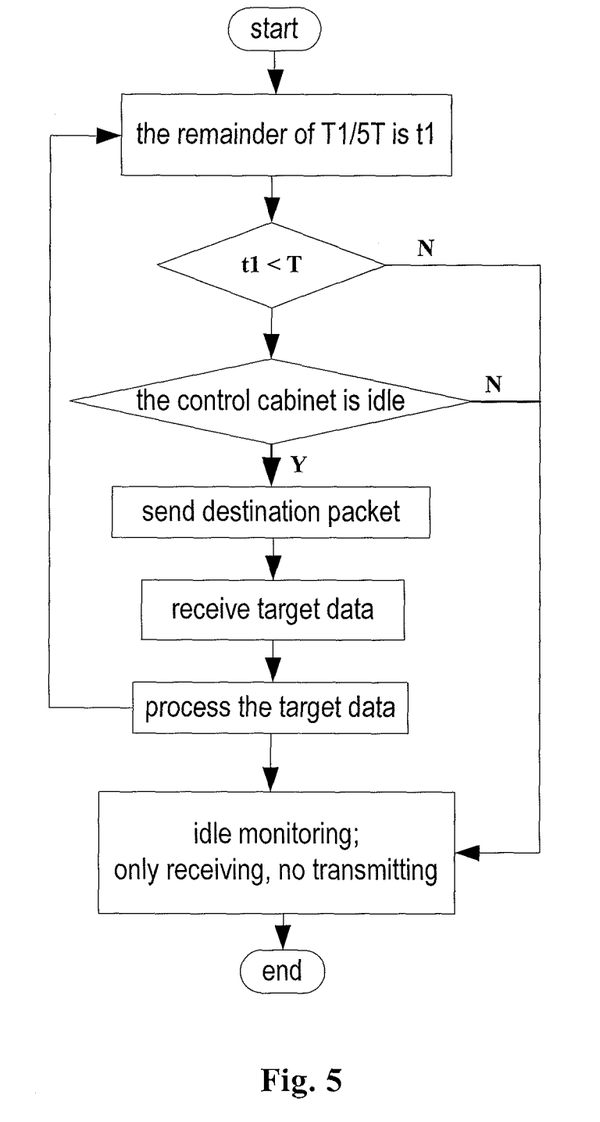
FIG. 5 is a flowchart of the communication process of the host computer.

The operation procedure of the host computer and the control cabinet in the preferred embodiments of the present invention will be described with reference to FIGS. 5 and 6.

In the synchronization phase, when the host computer is powered-up, the host computer waits for a first predetermined time; within the first predetermined time, the host computer monitors whether the control cabinet is idle; if it is monitored the control cabinet is idle, a handshake packet is sent to the idle control cabinet. After the control cabinets and the peripheral devices are powered-up (as shown in the dashed-line blocks in FIG. 6), the timer increments with a step of 1 ms (i.e. the clock interrupts at 1 ms after start), and wait for the handshake packet. In the synchronization phase, if the handshake packet is received by an idle control cabinet, the low level timer in the control cabinet is updated, such that the control cabinet is synchronized with the host computer and enters the operating phase. If in the synchronization phase a control cabinet fails to receive the handshake packet, the handshake packet can directly enter the free communication phase to communicate with the peripheral devices.

When the communication system enters the operating phase, the query step is performed. As shown in FIG. 5, the first arithmetic unit calculates a first remainder t1 by dividing the clock value T1 of the high level timer by the system period 5T, when the first remainder t1 is smaller than the period T required for the polling phase, it is determined that the host computer is in the polling phase; the host computer monitors the predetermined control cabinet, when the control cabinet is idle, the host computer sends destination packet to the idle control cabinet. When the first remainder t1 is larger than the period T required for the polling phase, it is determined that the host computer is in the free communication phase; the host computer monitors the predetermined control cabinet repeatedly, during this phase, the host computer only receive data without sending any data. When the predetermined control cabinet is busy, the host computer monitors the predetermined control cabinet repeatedly as to whether the control cabinet is idle, during this phase, the host computer only receive data without sending any data.

Figure 6:
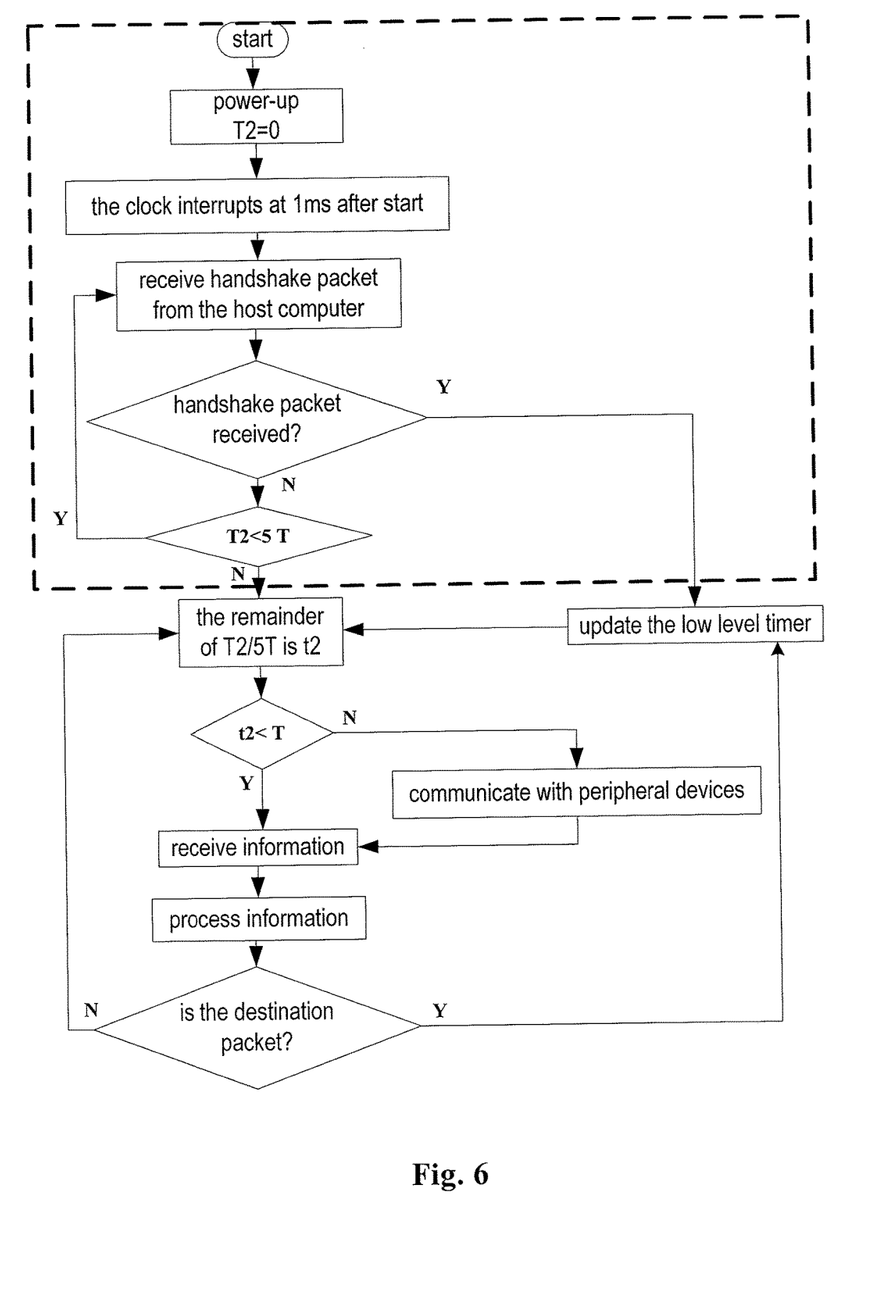
FIG. 6 is a flowchart of the communication process of the controller.

As shown in FIG. 6, the second arithmetic unit calculates a second remainder t2 by dividing the clock value T2 of the low level timer by the system period 5T, when the second remainder t2 is smaller than the period T required for the polling phase, it is determined that the control cabinet is in the polling phase; the control cabinet does not communicate with the peripheral devices, but to receive the destination packet. And when the second remainder t2 is larger than the period T required for the polling phase, it is determined that the control cabinet is in the free communication phase, the control cabinet communicates with the peripheral devices and receives data from the peripheral devices.

As shown in FIG. 6, after the control cabinet received the destination packet, the control cabinet processes the destination packet, determine the data required by the host computer, and judge whether the destination packet is issued by the host computer; if it is issued by the host computer, then update the low level timer and sends the target data to the host computer; if it is not issued by the host computer, then recalculate t2. Meanwhile, as shown in FIG. 5, the host computer processes the target data upon receipt of the target data, after the processing is finished, the host computer monitor another predetermined control cabinet (different from above predetermined control cabinet) as to whether it is idle, and recalculate t1.

It should be understood that, the received information in "receiving information" in FIG. 6 may be information sent from the peripheral devices 300 to the control cabinet 200 in the free communication phase, or be information sent from the host computer 100 to the control cabinet 200 in the polling phase. After the information is processed, it can be determined whether the information is a host computer packet; if it is the host computer packet, the control cabinet updates the low level timer, and if not, returns to the step of calculating t2.

It should be understood that above embodiments are only exemplary embodiments for illustrating the principle of the present invention; the present invention is not limited thereto. Various variations and improvements can be made by persons skilled in the art without departing from the spirit and essence of the present invention, and these variations and improvements should also be considered to be within the protection scope of the present invention.

The invention claimed is:

1. A communication system comprising a host computer, control cabinets and peripheral devices, the control cabinets comprising serial ports used for communication among the peripheral devices and the host computer, wherein, when the communication system is in an operating phase, a system period of the communication system includes a polling phase and a free communication phase, in the polling phase the host computer sends query instructions to the control cabinets through the serial ports on each of the control cabinets, and in the free communication phase the control cabinets communicate with the corresponding peripheral devices through the serial ports, the host computer is provided with a high level timer, the control cabinets are provided with a low level timer, the host computer comprises a host computer processor configured to acquire data from the control cabinets, the control cabinets comprise a wireless transceiver and a control device configured to communicate with the peripheral devices via the wireless transceiver in the free communication phase, wherein the host computer is provided with a first arithmetic unit electrically connected to the host computer processor, the control cabinets are provided with a second arithmetic unit electrically connected to the control device, the first arithmetic unit is configured to calculate a first remainder obtained by dividing a clock value of the high level timer by the system period, the host computer processor determines whether the host computer is in the polling phase on the basis of the first remainder, the second arithmetic unit is configured to calculate a second remainder obtained by dividing a clock value of the low level timer by the system period, and the control device determines whether the control cabinets are in the free communication phase on the basis of the second remainder.

2. The communication system according to claim 1, wherein the host computer further comprises and a host computer digital radio station electrically connected with the host computer processor, the host computer digital radio station communicates with the control cabinets, the host computer processor monitors the peripheral devices and the control cabinets by acquiring data from the control cabinets through the host computer digital radio station.

3. The communication system according to claim 2, wherein the control cabinets further comprise a control device, a control cabinet digital radio station that can communicate with the host computer, and the wireless transceiver can communicate with the peripheral devices, the control cabinet digital radio station and the wireless transceiver communicate with the control device through a same serial port, wherein in the polling phase the host computer sends the query instructions to the control cabinet digital radio station.

4. The communication system according to claim 3, wherein in the polling phase the host computer sends a destination packet including a clock value of the high level timer to the control cabinet, the control cabinets compare the clock value of the high level timer with the clock value of the low level timer, and synchronize the high level timer with the low level timer.

5. The communication system according to claim 4, wherein in the synchronization phase of the communication system, the host computer sends a handshake packet including the clock value of the high level timer to the control cabinet, the control cabinet receiving the handshake packet compares the clock value of the high level timer with the clock value of the low level timer, so as to synchronize the high level timer with the low level timer.

6. The communication system according to claim 1, wherein within a system period, the polling phase occupies 1 time slice, and the free communication phase occupies at least one time slice.

7. The communication system according to claim 3, further comprising an auxiliary device, wherein the auxiliary device is connected with the control device in the control cabinet and provides auxiliary parameters to the control device.

8. A communication method with peripheral devices for the communication system according to claim 1, wherein the communication method comprising a query step in an operating phase, the query step comprises:
   S2, determining the temporal state of the communication system;
   if the communication system is in a polling phase, then performs step S32: the host computer sends a query instruction to the control cabinet;
   if the communication system is in a free communication phase, then performs step S33: the control cabinet communicates with peripheral devices.

9. The communication method according to claim 8, wherein before the step S32, the following step is included:
   S31, the host computer sends idle monitoring instructions to the control cabinet, if it is monitored the control cabinet is idle, then performs step S32; if it is monitored the control cabinet is busy, then repeats step S31 until the control cabinet is idle.

10. The communication method according to claim 8, wherein when the communication system is in the polling phase, the step S32 comprises:
    S32a, the host computer sends a destination packet to the control cabinet, upon receipt of the destination packet, the control cabinet updates the low level timer based on the clock value of the high level timer in the destination packet, so as to synchronize the high level timer with the low level timer; and
    S32b, the control cabinet sends target data to the host computer.

11. The communication method according to claim 9, wherein when the communication system is in the polling phase, the step S32 comprises:
    S32a, the host computer sends a destination packet to the control cabinet, upon receipt of the destination packet, the control cabinet updates the low level timer based on the clock value of the high level timer in the destination packet, so as to synchronize the high level timer with the low level timer; and
    S32b, the control cabinet sends target data to the host computer.

12. The communication method according to claim 8, wherein the step S2 comprises:
    S21, the host computer obtains the clock value of the high level timer, and the control cabinet obtains the clock value of the low level timer;
    S22, the first arithmetic unit calculates a first remainder by dividing the clock value of the high level timer by the system period, when the first remainder is smaller than the period required for the polling phase, it is determined that the host computer is in the polling phase, and when the first remainder is larger than the period required for the polling phase, it is determined that the host computer is in the free communication phase; the second arithmetic unit calculates a second remainder by dividing the clock value of the low level timer by the system period, when the second remainder is smaller than the period required for the polling phase, it is determined that the control cabinet is in the polling phase, and when the second remainder is larger than the period required for the polling phase, it is determined that the control cabinet is in the free communication phase.

13. The communication method according to claim 9, wherein the step S2 comprises:
    S21, the host computer obtains the clock value of the high level timer, and the control cabinet obtains the clock value of the low level timer;
    S22, the first arithmetic unit calculates a first remainder by dividing the clock value of the high level timer by the system period, when the first remainder is smaller than the period required for the polling phase, it is determined that the host computer is in the polling phase, and when the first remainder is larger than the period required for the polling phase, it is determined that the host computer is in the free communication phase; the second arithmetic unit calculates a second remainder by dividing the clock value of the low level timer by the system period, when the second remainder is smaller than the period required for the polling phase, it is determined that the control cabinet is in the polling phase, and when the second remainder is larger than the period required for the polling phase, it is determined that the control cabinet is in the free communication phase.

14. The communication method according to claim 8, further comprising a synchronization step before the query step, the synchronization step being performed at a synchronization phase and comprising:
    S11, the host computer sends the handshake packet to the control cabinet;
    S12, the control cabinet updates the clock value of the low level timer in the control cabinet based on the clock value in the handshake packet, so as to synchronize the high level timer with the low level timer.

15. The communication method according to claim 9, further comprising a synchronization step before the query step, the synchronization step being performed at a synchronization phase and comprising:
    S11, the host computer sends the handshake packet to the control cabinet;
    S12, the control cabinet updates the clock value of the low level timer in the control cabinet based on the clock value in the handshake packet, so as to synchronize the high level timer with the low level timer.

16. The communication method according to claim 14, wherein the synchronization step further comprises:
    S10, after the host computer is powered-up, monitoring in a first predetermined time whether the control cabinet is idle; if it is monitored the control cabinet is idle, then performs step S11.

17. The communication method according to claim 14, wherein the period required for the synchronization step is 1~5 times of the system period.

18. The communication method according to claim 14, wherein if the control cabinet fails to receive the handshake packet in the synchronization phase, the control cabinet performs step S33.

19. The communication system according to claim 5, wherein the host computer is provided with a first arithmetic unit electrically connected to the host computer processor, the control cabinet is provided with a second arithmetic unit electrically connected to the control device, the first arithmetic unit is configured to calculate a first remainder obtained by dividing the clock value of the high level timer by the system period, the host computer processor determines whether the host computer is in the polling phase on the basis of the first remainder, the second arithmetic unit is configured to calculate a second remainder obtained by dividing the clock value of the low level timer by the system period, the control device determines whether the control cabinet is in the free communication phase on the basis of the second remainder.

* * * * *